No. 742,192. PATENTED OCT. 27, 1903.
O. A. HOYT.
MACHINE FOR MAKING ARTIFICIAL STONE BUILDING BLOCKS.
APPLICATION FILED JULY 23, 1903.
NO MODEL.
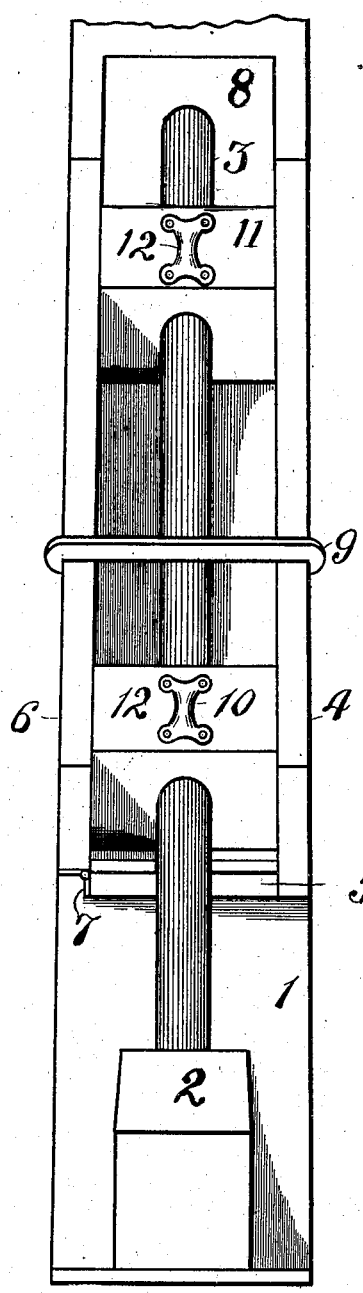

No. 742,192. Patented October 27, 1903.

UNITED STATES PATENT OFFICE.

OLIVER A. HOYT, OF AKRON, OHIO.

MACHINE FOR MAKING ARTIFICIAL-STONE BUILDING-BLOCKS.

SPECIFICATION forming part of Letters Patent No. 742,192, dated October 27, 1903.

Application filed July 23, 1903. Serial No. 166,717. (No model.)

*To all whom it may concern:*

Be it known that I, OLIVER A. HOYT, a citizen of the United States, residing at Akron, in the county of Summit and State of Ohio, have invented a certain new and useful Improvement in Machines for Making Artificial-Stone Building-Blocks, of which the following is a complete specification.

My invention has relation to improvements in machines for the manufacture of artificial-stone building-blocks; and the objects of my invention are to produce a device by which building-blocks of artificial stone may be rapidly and economically produced and one in which when the blocks have been properly shaped they may be removed from the machine by which they were produced to any convenient place for the purposes of permitting them to harden thoroughly, while at the same time the device may be used to produce another block, and thereby continuously use the machine without the necessity of leaving the green blocks in the machine while the necessary time elapses for hardening.

The primary object of my invention is to produce a machine which will produce blocks of any desired length without changing the device for each different length of block. Heretofore in the production of building-blocks they are usually made in molds of a certain definite size and are then conveyed, when properly hardened, to the building where the building in which they are to be used is to be erected.

It frequently happens in building the walls of the building that a space is left between the regular-sized blocks, which require the cutting away of a single block to fill the space thus left. In using this device, however, I place this device upon the premises where the building is to be erected, and the blocks are made of such a size as to exactly cover the space needed, and, if necessary, any particular size or length of block can be produced to suit the exigencies of the case.

To the accomplishment of the aforesaid objects my invention consists in the peculiar and novel construction, arrangement, and combination of parts hereinafter described, reference being had to the accompanying drawing, forming a part hereof.

In the drawing, which represents a perspective view of my improved device, 1 is a base or foundation board, which is usually of considerable length, on one end of which is firmly mounted a post 2, from which projects a mandrel 3. This mandrel may be made, if desired, of any cross-sectional configuration which it is desired to impart to the interior of the finished block. It may be here noted that it is common to make building-blocks of artificial material hollow, with a view to the saving of material and to give to them the desired lightness desirable for ready handling. This mandrel 3 is usually substantially parallel with the upper face of the platform or base-plank 1. Upon this base 1 is placed the mold in which the building-block is to be manufactured, which consists of an upright side piece 4, firmly attached to a bottom board 5, and to this board 5 is attached by hinges 7 an opposite side board 6. I customarily place within this mold an extra base-board 8, lying flat upon the base 5, for a purpose to be described. Across the upper free ends of the side boards 4 6 is placed a clamp 9, which holds them in a suitable position for the manufacture of building-blocks. Within the interior of the three-sided box or mold thus formed are two sliding tamps or rams 10 11, horizontally perforated to inclose the mandrel 3 and each having on their upper surface handles 12, by which they are manipulated.

The operation of the device is as follows: The mold, composed of the side pieces 4 and 6 and the bottom board 5, is placed upon the bottom plank and the extra bottom board 8 placed upon the board 5 and the clamp 9 suitably fastened in position, as shown in the drawing. The tamp or ram 10 is then slid into the box, with the mandrel 3 passing through its central portion until it reaches nearly to one end of the mold, and the tamp or ram 11 slid on the mandrel 3 into the opposite end of the mold, and when the device is in position for operation it is in the position as substantially shown in the drawing. Material consisting of sand and cement sufficiently moistened is then placed within the space surrounded by the sides 4 and 6 and the bottom board 8 until a desired quantity has been placed therein, when an operator grasps each of the handles 12 and pushes them rapidly by successive strokes toward each other, thereby firmly compressing the material from which the blocks are to be made into a compact mass of a desired length. This tamping or ramming is kept up by the tamps or rams 10 and 11 until a sufficient compactness has been attained in the block. A straightedge is then passed across the top edges of the two side pieces 4 and 6, which causes the upper face of the block to become smooth and level. The mold, with the tamps and compressed block, is then slid along the base 1 until free from the mandrel 3 and the clamp 9 removed and the side 6 swung down on its hinges and the block lifted out on the board 8. The board 8, carrying the finished block, is then removed to any desired place for a definite length of time to permit it to sufficiently harden, when it is ready for use. The next block is produced by placing a new board 8 within the body of the mold, returning the tamp 11 to its position, and refilling the mold. This process may be kept up indefinitely, only requiring a renewal of the boards 8.

If it is desired to impress upon the face of the finished product a design of a peculiar nature, it is impressed or cut into the inside face of the hinged side 6, and at the conclusion of the manufacture of the block when the side 6 is swung down on the hinges 7 the ready removal of the block, with the impression desired impressed upon it, is readily attainable.

What I claim, and desire to secure by Letters Patent, is—

1. The combination in a device of the class specified, of a base-board, a mandrel arranged to form an opening in the finished product, firmly and immovably mounted above said board, a mold to inclose and surround said mandrel, two freely-slidable tamps or rams mounted in said mold and inclosing said mandrel.

2. The combination in a device of the class specified, of a base-board, a fixed immovable mandrel mounted above said board, freely-slidable tamps mounted on said mandrel, a mold mounted on said board to surround said tamps and mandrel, one of the sides whereof is hinged.

In testimony that I claim the above I hereunto set my hand in the presence of two subscribing witnesses.

OLIVER A. HOYT.

In presence of—
 MAUDE ZWISLER,
 C. E. HUMPHREY.